United States Patent
Kang et al.

(10) Patent No.: US 10,810,745 B2
(45) Date of Patent: Oct. 20, 2020

(54) METHOD AND APPARATUS WITH IMAGE SEGMENTATION

(71) Applicant: SAMSUNG ELECTRONICS CO., LTD., Suwon-si (KR)

(72) Inventors: Nahyup Kang, Seoul (KR); KeeChang Lee, Seongnam-si (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 16/103,187

(22) Filed: Aug. 14, 2018

(65) Prior Publication Data
US 2019/0295261 A1  Sep. 26, 2019

(30) Foreign Application Priority Data
Mar. 26, 2018  (KR) .................. 10-2018-0034286

(51) Int. Cl.
 *G06T 7/136* (2017.01)
 *G06K 9/62* (2006.01)
 *G06N 3/04* (2006.01)
 *G06N 3/08* (2006.01)

(52) U.S. Cl.
 CPC .......... *G06T 7/136* (2017.01); *G06K 9/6256* (2013.01); *G06N 3/0481* (2013.01); *G06N 3/08* (2013.01)

(58) Field of Classification Search
 CPC .... G06T 7/136; G06K 9/6256; G06K 9/6271; G06K 9/6262; G06N 3/0481; G06N 3/08; G06N 20/10; G06N 3/0454; G06N 3/084
 See application file for complete search history.

(56) References Cited

U.S. PATENT DOCUMENTS

| | | | |
|---|---|---|---|
| 9,123,095 B2 | 9/2015 | Lee et al. | |
| 9,536,315 B2 | 1/2017 | Bulan et al. | |
| 9,710,729 B2 | 7/2017 | Chidlovskii et al. | |
| 2016/0070976 A1* | 3/2016 | Aoba | G06K 9/6262 382/180 |
| 2017/0213339 A1* | 7/2017 | Hibbard | G06T 7/11 |
| 2017/0249534 A1 | 8/2017 | Townsend et al. | |

(Continued)

OTHER PUBLICATIONS

Ganin, Yaroslav, et al. "Domain-Adversarial Training of Neural Networks." *The Journal of Machine Learning Research* 17.1 (2016): 2096-2030. (35 pages, in English).

(Continued)

*Primary Examiner* — Christopher M Brandt
(74) *Attorney, Agent, or Firm* — NSIP Law

(57) ABSTRACT

A processor-implemented learning method for an image segmentation includes training first duplicate layers, as duplications of trained first layers of a pre-trained model, so that a second feature extracted from a target image by the trained first duplicate layers is matched to a first feature extracted from a training image by the trained first layers; regularizing the trained first duplicate layers so that a similarity between the first feature and a third feature extracted from the training image by the regularized first duplicate layers meets a threshold; and training second duplicate layers, as duplications of trained second layers of the pre-trained model, to be configured to segment the target image based on the regularized first duplicate layers, the trained second layer being configured to segment the training image.

9 Claims, 9 Drawing Sheets

(56) References Cited

U.S. PATENT DOCUMENTS

| | | |
|---|---|---|
| 2017/0278135 A1 | 9/2017 | Majumdar et al. |
| 2017/0316281 A1 | 11/2017 | Criminisi et al. |
| 2017/0337464 A1 | 11/2017 | Rabinowitz et al. |
| 2017/0351935 A1 | 12/2017 | Liu et al. |
| 2017/0351952 A1 | 12/2017 | Zhang et al. |
| 2018/0144209 A1* | 5/2018 | Kim ............ G16H 30/40 |
| 2019/0205606 A1* | 7/2019 | Zhou ............ G06N 3/0445 |

OTHER PUBLICATIONS

Tzeng, Eric, et al. "Adversarial Discriminative Domain Adaptation." *Computer Vision and Pattern Recognition* (*CVPR*). vol. 1. No. 2. 2017. (10 pages, in English).

* cited by examiner

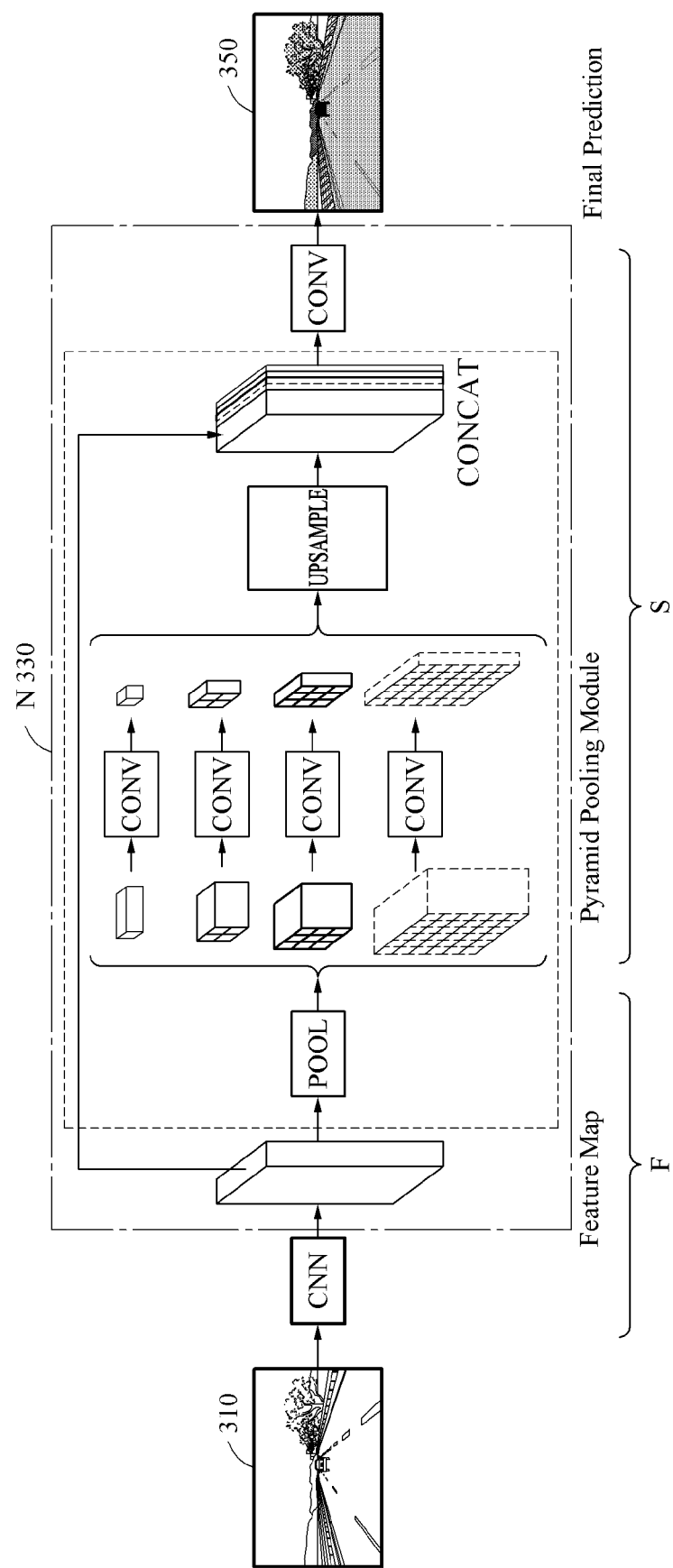

METHOD AND APPARATUS WITH IMAGE SEGMENTATION

CROSS-REFERENCE TO RELATED APPLICATIONS

This application claims the benefit under 35 USC § 119(a) of Korean Patent Application No. 10-2018-0034286, filed on Mar. 26, 2018, in the Korean Intellectual Property Office, the entire disclosure of which is incorporated herein by reference for all purposes.

BACKGROUND

1. Field

The following description relates to a method and apparatus with image segmentation.

2. Description of Related Art

Even when a training model with a good performance is applied to actual data for image segmentation, results are inaccurate when a domain distribution between training data and actually used data is different. A fine-tuning process of learning target data based on label information corresponding to actually measured data (ground-truth (GT)) of target data may be performed. However, high costs are required to include the actually measured data and/or the label information corresponding to the actually measured data. In addition, it may be difficult to know the actually measured data and/or the label information corresponding to the actually measured data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented learning method for an image segmentation, including: training first duplicate layers, as duplications of trained first layers of a pre-trained model, so that a second feature extracted from a target image by the trained first duplicate layers is matched to a first feature extracted from a training image by the trained first layers; regularizing the trained first duplicate layers so that a similarity between the first feature and a third feature extracted from the training image by the regularized first duplicate layers meets a threshold; and training second duplicate layers, as duplications of trained second layers of the pre-trained model, to be configured to segment the target image based on the regularized first duplicate layers, the trained second layer being configured to segment the training image.

The method may further include generating a new model by combining the regularized first duplicate layers and the trained second duplicate layers; and segmenting the target image by semantic segmentation using the generated new model.

The training image may be an image of a first domain environment different from a second domain environment of the target image.

The training of the first duplicate layers may include training the first duplicate layers based on a loss corresponding to a difference between the first feature and the second feature.

The training of the first duplicate layers may include training a discriminator neural network to discriminate between the first feature and the second feature.

The trained second duplicate layers may be configured to segment the training image based on the third feature; and the training of the second duplicate layers may include training the second duplicate layers so that a label of the segmented training image is matched to a predefined label corresponding to the training image.

The training of the second duplicate layers may include training the second duplicate layers to be configured to segment the target image based on another second feature extracted from the target image by the regularized first duplicate layers.

The method may further include identifying from a pre-trained neural network, as the pre-trained model, the trained first layers and the trained second layers based on the training image and predefined labels corresponding to the training image.

The second duplicate layers may be configured to segment the target image by semantic segmentation based on the second feature.

In another general aspect, there is provided a processor-implemented learning method for an image segmentation, including: training a discriminator neural network configured to discriminate between a feature extracted from a training image and a feature extracted from a target image; training, based on a loss of the discriminator neural network, first duplicate layers, as duplications of trained first layers, so that a second feature extracted from the target image by the trained first duplicate layers is matched to a first feature extracted from the training image by the trained first layers, the trained first layers being included in a first neural network and configured to extract the first feature from the training image; regularizing the trained first duplicate layers so that a similarity between the first feature and a third feature extracted from the training image by the regularized first duplicate layers meets a threshold; and training second duplicate layers, as duplications of trained second layers, to correspond to the regularized first duplicate layers, the trained second layers being included in the first neural network and configured to segment the training image based on the first feature.

The training of the first duplicate layers may include training the first duplicate layers based on a loss corresponding to a difference between the first feature and the second feature.

The training of the first duplicate layers may include training the first duplicate layers so that the second feature is determined by the discriminator neural network to be extracted from the training image.

The method may further include training the first neural network using training data.

The second duplicate layers may be configured to segment the training image based on the third feature; and the training of the second duplicate layers may include training the second duplicate layers so that a label of the segmented training image is matched to a predefined label corresponding to the training image.

In another general aspect, there is provided a processor-implemented learning method for an image segmentation, including: extracting, by duplicate feature extraction layers, second features from target images and third features from the training images; segmenting, by duplicate segmentation layers, the target images based on the second features and the training images based on the third features; training the duplicate feature extraction layers at least until one of the second features matches one of first features extracted from training images by initial feature extraction layers; and regularizing the duplicate feature extraction layers at least until a similarity between another one of the first features and one of the third features meets a threshold.

The method may further include training the duplicate segmentation layers at least until a label of one of the segmented training images is matched to a predefined label corresponding to the one training image.

In another general aspect, there is provided a processor-implemented image segmentation method including: acquiring a target image; applying the target image to a neural network that is trained to extract a feature from the target image and to generate a segmentation image by segmenting an object included in the target image into semantic units based on the feature.

The neural network may further include first duplicate layers, as duplications of trained first layers of a pre-trained neural network, configured to extract a first feature from a training image; and second duplicate layers, as duplications of trained second layers of the pre-trained neural network, configured to segment the training image based on the first feature.

The first duplicate layers may be trained so that a second feature extracted from the target image by the trained first duplicate layers is matched to the first feature.

The first duplicate layers may be trained based on a loss corresponding to a difference between the first feature and a second feature extracted from the target image by the first duplicate layers, so that the second feature is matched to the first feature.

The first duplicate layers may be regularized so that a similarity between the first feature and a third feature extracted from the training image by the regularized first duplicate layers meets a threshold.

The second duplicate layers may be trained to be configured to segment the target image based on the regularized first duplicate layers.

The second duplicate layers may be trained to be configured to segment the training image based on the third feature so that a label of the segmented training image is matched to a predefined label corresponding to the training image.

A non-transitory computer-readable storage medium may store instructions that, when executed by a processor, cause the processor to perform the method.

In another general aspect, there is provided an image segmentation apparatus including: an image sensor configured to acquire a target image; and a processor configured to apply the target image to a neural network that is trained to extract a feature from the target image and to generate a segmentation image by segmenting an object included in the target image into semantic units based on the extracted feature.

Other features and aspects will be apparent from the following detailed description, the drawings, and the claims.

BRIEF DESCRIPTION OF THE DRAWINGS

FIG. 3 illustrates an example of a neural network including first layers and second layers.

Figure 1:
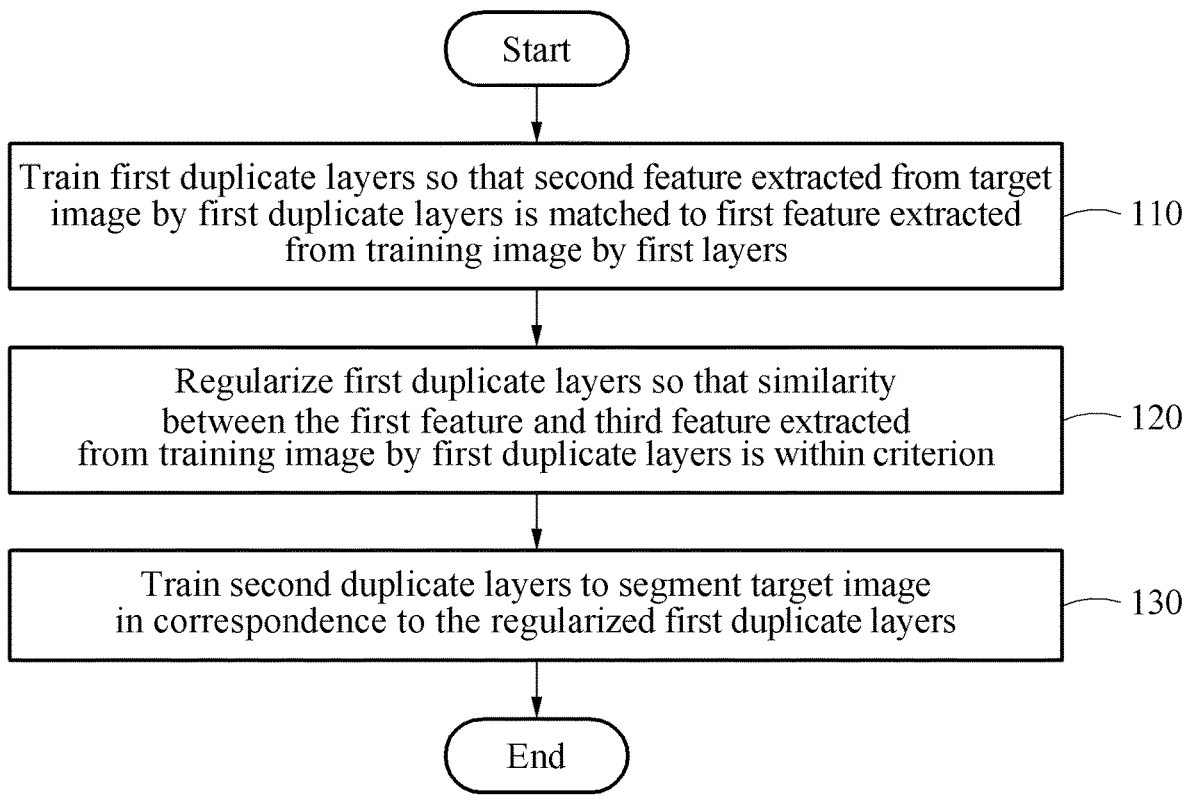
FIG. 1 is a flowchart illustrating an example of a learning method for an image segmentation.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used herein, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood and in view of the disclosure of this application. Terms defined in dictionaries generally used should be construed to have meanings matching with contextual meanings in the relevant art and the disclosure of this application, and are not to be construed as an ideal or excessively formal meaning unless otherwise defined herein.

In the following description, examples may include, or be utilized to, display a lane or to generate visual information to assist steering of an autonomous vehicle in an augmented reality (AR) navigation system such as a smart vehicle. Also, the examples may include, or be used to, interpret visual information in an included device including an intelligent system such as a head-up display (HUD) installed for driving assistance or fully autonomous driving of a vehicle and to assist or provide safe and pleasant driving. The examples may include, or be applicable to, for example, an autonomous vehicle, an intelligent vehicle, a smartphone or a mobile device. Hereinafter, the examples will be described in detail with reference to the accompanying drawings, wherein like drawing reference numerals are used for like elements. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

FIG. 1 is a flowchart illustrating an example of a learning method for an image segmentation. Referring to FIG. 1, in operation 110, a training apparatus trains first duplicate layers so that a first feature extracted from a training image is matched to a second feature extracted from a target image by the first duplicate layers. The first feature corresponds to a feature vector or a feature extracted from the training image as a result of processing by first layers, and the second feature corresponds to a feature vector or a feature extracted from the target image as a result of processing by the first duplicate layers. The first layers and second layers are respective layers, or multi-layer portions, of a pre-trained neural network trained based on one or more training images provided in advance for learning and one or more labels corresponding to the one or more training images. The first layers are layers trained to extract the first feature from the training image. Also, the second layers are layers trained to segment objects included in the training image by semantics based on the first feature extracted by the first layers. The second layers may generate a segmentation image corresponding to the training image by segmenting objects included in the training image by semantics. For example, the first layers are referred to as "feature extraction layers," and the second layers are referred to as "segmentation layers." Semantic segmentation (or scene segmentation) is a technique herein that may precisely identify a boundary of a specific object included in an image. That is, semantic segmentation may partition an image into semantically meaningful parts, and classify the parts into classes. Semantic segmentation herein may also be a technique not only for identifying what is in the image, but also for precisely figuring out locations of objects in the image, for example.

Prior to operation 110, the training apparatus generates the first duplicate layers by duplicating the first layers. The first duplicate layers are configured to extract the second feature from the target image. Also, the training apparatus generates second duplicate layers by duplicating the second layers. The second duplicate layers are configured to segment the target image by semantics based on the second feature extracted from the target image by the first duplicate layers. The second duplicate layers also generate a segmentation image corresponding to the target image by segmenting objects included in the target image by semantics. The first duplicate layers correspond to layers obtained by duplicating the first layers, and the second duplicate layers correspond to layers obtained by duplicating the second layers.

The target image corresponds to an image used to generate a segmentation image by segmenting objects included in the image by semantics. The target image is, for example, an image captured by a capturing device or an image sensor included in the training apparatus. The target image is, for example, a two-dimensional (2D) image or a three-dimensional (3D) color image, a monochrome image or an infrared image, however, examples are not limited thereto. In examples, the target may be a same environmental domain as the one or more environmental domains of the training images, a different environmental domain, or an unknown environmental domain.

The target image is, for example, an image acquired by capturing a front view or a side view of a vehicle that is driving on a road. A single target image or a plurality of target images may be provided, and may be acquired for each frame using a capturing device mounted on a front side of the vehicle. The capturing device includes, for example, a mono camera, a vision sensor, an image sensor, an infrared ray sensor, or a device configured to perform similar functions to those of the above sensors. The target image is, for example, an image captured by a capturing device included in an image segmentation apparatus or by devices other than the image segmentation apparatus.

In operation 110, the training apparatus trains the first duplicate layers based on a loss corresponding to a difference between the first feature and the second feature, so that the second feature is matched to the first feature. For example, a discriminator neural network corresponds to a neural network trained to distinguish whether a corresponding feature is extracted from the training image or from the target image. The discriminator neural network is trained to discriminate between the first feature extracted from the training image by the first layers and the second feature extracted from the target image by the first duplicate layers. In operation 110, the training apparatus trains the first duplicate layers so that the second feature extracted from the target image by the first duplicate layers is matched to the first feature extracted from the training image by the first layers, e.g., to a predetermined similarity or accuracy, or such that a discriminator neural network determines that the second feature was extracted from the training image.

In operation 120, the training apparatus regularizes the first duplicate layers so that a similarity between the first feature and a third feature extracted from the training image by the first duplicate layers is within a preset criterion (e.g., so that a value of the similarity is within a predetermined range, meets a predetermined threshold, is above a predetermined threshold, and/or is below a predetermined threshold). The training apparatus tunes or adjusts parameters or weights of the first duplicate layers so that the third feature is the same or similar to the first feature. An example of a method by which the training apparatus trains and regularizes the first duplicate layers will be further described below with reference to FIGS. 2, 4A, and 4B.

In operation 130, the training apparatus trains the second duplicate layers to segment the target image in correspondence to the first duplicate layers regularized in operation 120. For example, the training apparatus trains the second duplicate layers so that a label of the training image segmented by the second duplicate layers based on a feature extracted from the training image by the regularized first duplicate layers is matched to a predefined label corresponding to the training image. By this training, the second duplicate layers are trained to segment the target image based on a feature extracted from the target image by the regularized first duplicate layers.

The training apparatus combines the regularized first duplicate layers and the second duplicate layers to generate a new learning neural network that is configured to generate a segmentation image by segmenting the target image by semantics.

The neural networks described herein use a large number of nodes that may be connected by edges, e.g., by weighted connections, and/or that may apply trained kernels, e.g., in implemented convolutional operations. The neural networks are implemented through hardware or a combination of hardware and instructions, e.g., through instructions stored in a non-transitory memory of the image matching device, which when executed by one or more processors of the image matching device, cause the one or more processors to implement the neural networks. The trained neural networks may be stored in the memory of the image matching device in various structures. The various data structures may include storing the resulting trained parameters, e.g., including the trained connection weights and/or kernels, in vector, matrix, volume, or other single or multi-dimensional data structure. Also, though the apparatuses and methods are discussed using the example neural network structure, alternate machine learning structures may also be available in other examples. Thus, as described herein, one or more processors configured to implement such neural networks or neural network portions, or other machine learning structures, is inclusive of all such examples of such hardware and/or hardware/instruction implementations.

Figure 2:
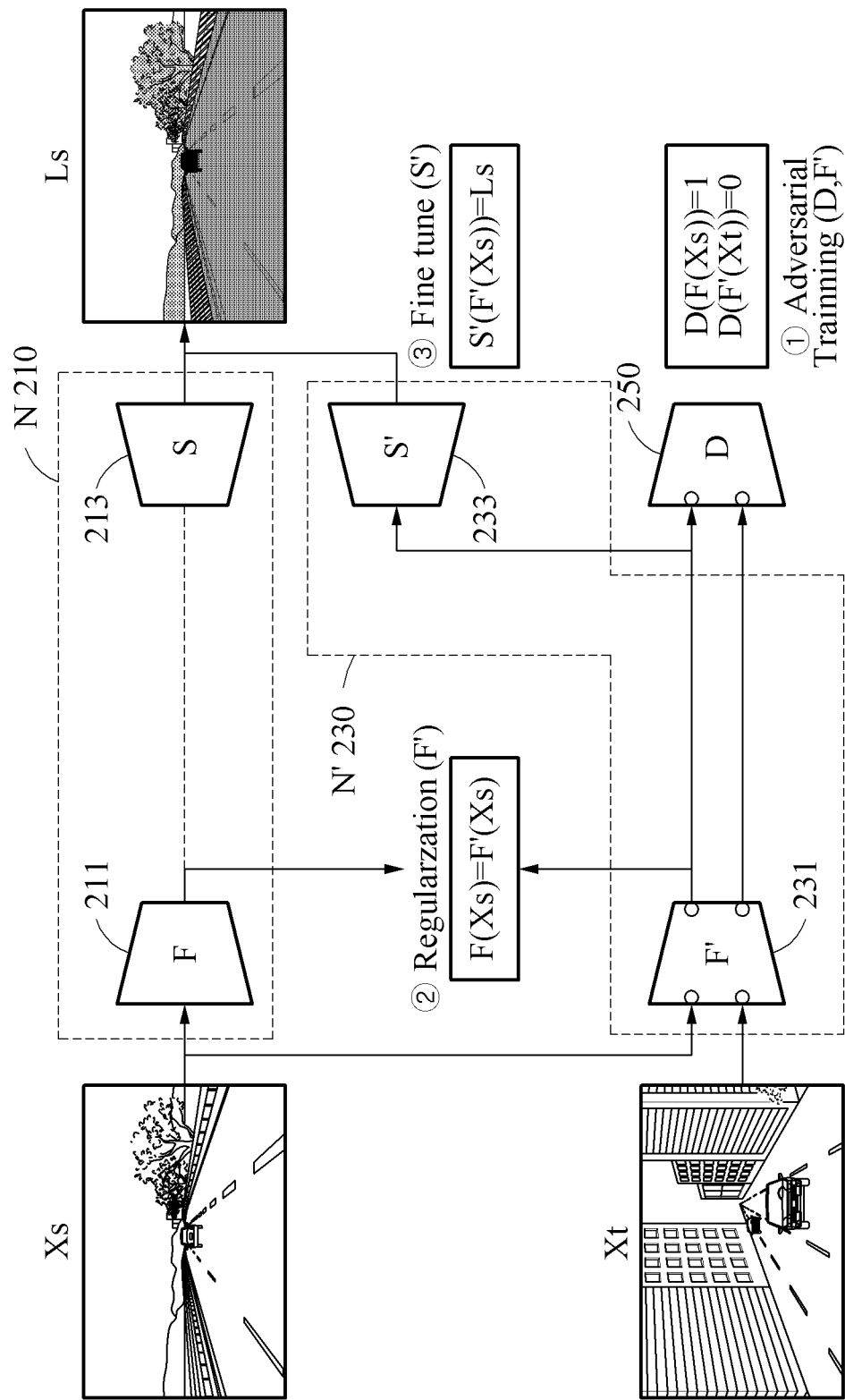
FIG. 2 illustrates an example of a learning method for an image segmentation.

FIG. 2 illustrates an example of a learning method for an image segmentation. FIG. 2 illustrates a pre-trained neural network N 210, first layers F 211, second layers S 213, a new learning neural network N' 230, first duplicate layers F' 231, second duplicate layers S' 233, and a discriminator neural network D 250. The neural network N 210 includes first layers F 211 and second layers S 213. The new learning neural network N' 230 includes the first duplicate layers F' 231, second duplicate layers S' 233. The first duplicate layers F' 231 are generated by duplicating the first layers F 211, and the second duplicate layers S' 233 generated by duplicating the second layers S 213. The new learning neural network N' 230 is substituted for the pre-trained neural network N 210, as will be discussed in more detail below.

In FIG. 2, Xs represents one or more training images (or one or more source images), or a set thereof. Ls represents one or more label images, or a set thereof, classified by one or more labels corresponding to the one or more training images (or the one or more source images). Also, Xt represents one or more images that are to be actually used, for example, one or more target images or a set thereof. The training apparatus may train the first duplicate layers F' 231 and the second duplicate layers S' 233 without the use of one or more labels corresponding to the one or more target images Xt (or one or more label images classified by the one or more labels), for example.

The neural network N 210 includes the first layers F 211 configured to extract features and the second layers S 213 configured to perform a segmentation. Also, training of the first layers F 211 and the second layers S 213 are completed based on one or more training images Xs and one or more label images Ls. An example of an operation of the pre-trained neural network N 210 will be further described below with reference to FIG. 3.

A training apparatus generates the first duplicate layers F' 231 by duplicating the first layers F 211. For example, when a training image Xs is input, the first layers F 211 extract or generate a feature F(Xs) from the training image Xs. When a target image Xt is input, the first duplicate layers F' 231 extract or generate a feature F'(Xt) from the target image Xt. Thus, during learning, the training apparatus extracts or generates two features, that is, the feature F(Xs) corresponding to the training image Xs and the feature F'(Xt) corresponding to the target image Xt. The duplicating may include generating a new neural network with the first duplicate layers F' 231 that have the same structure and parameters, e.g., connection weights and/or kernels, as the first layers F 211.

The training apparatus forms the discriminator neural network D 250 that receives, as inputs, the feature F(Xs) corresponding to the training image Xs and the feature F'(Xt) corresponding to the target image Xt. The discriminator neural network D 250 is trained to distinguish whether a corresponding feature is extracted from the training image Xs or the target image Xt, in response to inputs of the features F(Xs) and F'(Xt). That is, the discriminator neural network D 250 is trained to determine from which image (e.g., either the training image Xs or the target image Xt) a received feature (e.g., either feature F(Xs) or feature F'(Xt)) was extracted. For example, the discriminator neural network D 250 may be trained to satisfy "D(F(Xs))=1," and "D(F'(Xt))=0," wherein an output of "1" indicates a determination that a corresponding feature was extracted from the training image Xs and an output of "0" indicates a determination that the corresponding feature was extracted from the target image Xt and/or not extracted from the training image Xs. The training apparatus may train the first duplicate layers F' 231 together while training the discriminator neural network D 250. Thus, the first duplicate layers F' 231 are trained such that the feature F'(Xt) input into the discriminator neural network D 250 is incorrectly determined to be extracted from the training image Xs (i.e., the discriminator neural network D 250 outputs "D(F'(Xt))=1"). For example, the parameters of the first duplicate layers F' 231 are adjusted until the trained condition is met.

The above learning method is referred to as an "adversarial training." The training apparatus performs an adversarial training ① of the first duplicate layers F' 231 using the discriminator neural network D 250. An example of an operating method of the discriminator neural network D 250 will be further described below with reference to FIGS. 4A and 4B.

For example, the training apparatus fine tunes parameters or weights of the first duplicate layers F' 231, to perform processing as if the training image Xs is input even though the target image Xt is input. In this example, the training apparatus allows the feature F(Xs) to continue to be uniformly distributed by fixing weights of the first layers F 211.

The training apparatus then performs a regularization ② of the adversarially-trained first duplicate layers F' 231 so that a feature F'(Xs) (for example, a third feature) extracted from the training image Xs by the first duplicate layers F' 231 is similar to the feature F(Xs) (for example, a first feature) extracted from the training image Xs by the first layers F 211. For example, the training apparatus tunes the weights of the adversarially-trained first duplicate layers F' 231 so that a similarity between the features F'(Xs) and F(Xs) is within a preset criterion. For example, a loss corresponding to a difference between the features F'(Xs) and F(Xs) is used to train the adversarially-trained first duplicate layers F' 231 using a back-propagation scheme, to generate regularized first duplicate layers F' 231.

The above regularization corresponds to a process of tuning aspects (for example, parameter values or weights) of the adversarially-trained first duplicate layers F' 231 so a feature extraction result thereof matches or substantially matches an original feature extraction result of the first layers F 211 in order to prevent a loss of the original feature of the first layers F 211 during retraining of the adversarially-trained first duplicate layers F' 231 to correspond to the target image Xt.

The training apparatus fixes the regularized first duplicate layers F' 231 that are finally tuned, and generates the second duplicate layers S' 233 by duplicating the second layers S 213. The training apparatus updates the second duplicate layers S' 233 by training the second duplicate layers S' 233 based on the one or more training images Xs and predefined one or more labels corresponding to the one or more training images Xs. The training apparatus trains the second duplicate layers S' 233 so that a label of the one or more training images Xs, segmented based on a feature extracted from the one or more training images Xs by the regularized first duplicate layers F' 231, is matched to a predefined label corresponding to the training image. The above process corresponds to a process of fine tuning ③ so that the second duplicate layers S' 233 correspond to a feature space changed in correspondence to the first duplicate layers F' 231, because the first duplicate layers F' 231 have a feature space changed by reflecting a portion of the target image Xt.

Depending on examples, an order of the adversarial training ① and the regularization ② is changed, or the adversarial training ① and the regularization ② are repeatedly performed. The fine tuning ③ is performed to fine tune the second duplicate layers S' 233 in correspondence to the finally tuned first duplicate layers F' 231, and thus may be performed when both the adversarial training ① and the regularization ② are completed.

The training apparatus forms a new learning neural network N' 230 that is substituted for the pre-trained neural network N 210, by connecting the regularized first duplicate layers F' 231 and the trained second duplicate layers S' 233, e.g., which are trained through the above-described processes.

According to an example, duplicate layers (for example, the first duplicate layers F' 231 and the second duplicate layers S' 233) are generated by duplicating layers included in the pre-trained neural network N 210 and training the duplicated layers with respect to one or more target images Xt. The trained duplicate layers are then retrained based on the one or more training images Xs applied to the pre-trained neural network N 210, the predefined one or more labels Ls corresponding to the training image Xs, and the discriminator neural network D 250. Thus, through the training by the training apparatus as disclosed herein, the image segmentation apparatus disclosed herein, in an example, is capable of performing a domain adaptation without needing to use actually measured data and label information corresponding to the actually measured data (e.g., performing domain adaptation even when the actually measured data and the corresponding label information are absent).

The new learning neural network N' 230 may have the same structure as that of the neural network N 210, however, parameters or weights of the new learning neural network N' 230 have been updated such that the new learning neural network N' 230 is matched to the target images Xt and the training images Xs.

For example, when the target image Xt is input, the new learning neural network N' 230 may segment the target image Xt and acquire an excellent performance in comparison to the neural network N 210 if the target image Xt were provided to the neural network N 210. That is, as the new learning neural network N' 230 has been trained based on the target images Xt and the training images Xs, the new learning neural network N' 230's ability to further segment the target image Xt is improved compared to the neural network N 210.

FIG. 3 illustrates an example of a neural network N 330 that includes first layers and second layers. Referring to FIG. 3, the neural network N 330 generates a segmentation image 350 through a feature extraction process F and a segmentation process S in response to an input of a training image 310.

The feature extraction process F corresponds to, for example, a process of generating one or more feature maps based on features extracted from the training image 310, e.g., by convolutional layers in multiple stages. The training image 310 is, for example, a 2D or 3D color image, a monochrome image or an infrared image, however, examples are not limited thereto.

The segmentation process S corresponds to, for example, a process of segmenting an object included in the training image 310 using a classification network including a fully connected layer. The neural network N 330 segments an object in the training image 310 into semantic units using a classification network such as AlexNet, VGGNet, or GoogleNET, analyzes semantics of each region obtained by segmenting the object in pixel units, and performs labeling for each class, to generate the segmentation image 350. For example, "20" classes may be obtained based on semantic units, for example, a road, a vehicle, a sidewalk, a person, an animal, sky, or a building, as non-limiting examples.

An image segmentation apparatus that will be described below may precisely analyze where and how components, such as an object or a background, are located in an image, from, for example, pixel-wise labels included in the segmentation image 350. Also, the image segmentation apparatus may classify components included in the segmentation image 350 using, for example, a pre-trained convolutional neural network (CNN), a deep neural network (DNN) or a support vector machine (SVM), as non-limiting examples.

The feature extraction process F is performed by the above-described first layers, and the segmentation process S is performed by the above-described second layers.

The first layers in the neural network N 330 form resultant one or more feature maps, e.g., based on one or more feature vectors or one or more features extracted from the training image 310 through convolutional layers in multiple stages, and transfers information about the one or more feature maps to the segmentation process S, e.g., through a pooling layer.

In an example, the training image 310 may be reduced to $\frac{1}{32}$ of an original image size through the classification network in the segmentation process S. For a fine prediction in a pixel unit, the neural network may also N 330 perform a process of restoring an image reduced in size to an original image size through upsampling and a connection using concatenation layers.

In the segmentation process S, the neural network N 330 segments the training image 310 into a plurality of regions using a classifier model that is trained to output a training output in response to an input of the training image 310. The classifier model is, for example, a CNN. The training output indicates, for example, a region image obtained by segmenting the training image 310. For example, the training output may be a region image obtained by a segmentation based on an attribute or a class (for example, a vehicle, a person, an object, or a background) that may be manually designated and that may correspond to each of pixels of the training image 310, as a non-limiting example.

Figure 4A:
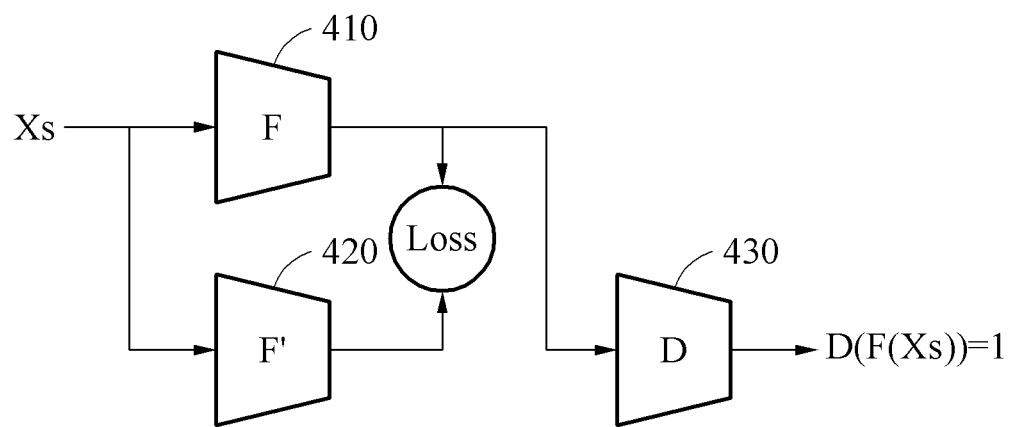
FIGS. 4A and 4B illustrate examples of an operation of training duplicate layers and a discriminator neural network.
Figure 4B:
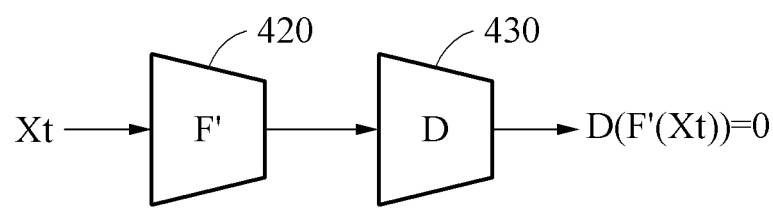

FIGS. 4A and 4B illustrate examples of an operation of training duplicate layers and a discriminator neural network. FIG. 4A illustrates an operation of training first duplicate layers F' 420 and a discriminator neural network D 430 in response to a training image Xs being input to a training apparatus.

Referring to FIG. 4A, when the training image Xs is input to the training apparatus, first layers F 410 extract a feature F(Xs) corresponding to the training image Xs, and the first duplicate layers F' 420 extract a feature F'(Xs) corresponding to the training image Xs. Through training, the training apparatus regularizes the first duplicate layers F' 420 so that the feature F'(Xs) extracted from the training image Xs by the first duplicate layers F' 420 is matched to the feature F(Xs) extracted from the training image Xs by the first layers F 410. For example, a determined loss corresponding to a difference between the features F'(Xs) and F(Xs) is used to train the first duplicate layers F' 420 using a back-propagation scheme, to regularize the first duplicate layers F' 420.

The training apparatus applies the feature F(Xs) to the discriminator neural network D 430, and trains the neural network D 430 so that an output D(F(Xs)) of the neural network D 430 is equal to a predetermined first value (for example, a value of "1"), e.g., such that an output D(F(Xs)) equal to the predetermined first value indicates a determination by the neural network D 430 that the feature F(Xs) was extracted from the training image Xs. In an example, the training of the first duplicate layers F' 420 and the training of the neural network D 430 may be performed together.

FIG. 4B illustrates an operation of training the trained first duplicate layers F' 420 and the discriminator neural network D 430 in response to a target image Xt being input to the training apparatus.

Referring to FIG. 4B, when the target image Xt is input to the training apparatus, the training apparatus applies a feature F'(Xt) extracted from the target image Xt by the first duplicate layers F' 420 to the neural network D 430. The training apparatus trains the neural network D 430 and the first duplicate layers F' 420 so that an output D(F'(Xt)) of the neural network D 430 is equal to a predetermined second value (for example, a value of "0"), e.g., such that an output D(F(Xs)) equal to the predetermined second value indicates a determination by the neural network D 430 that the feature F(Xt) was either extracted from the target image Xt or not extracted from the training image Xs.

In the examples of FIGS. 4A and 4B, the training image Xs and the target image Xt may not be simultaneously input to the training apparatus, e.g., operations of FIGS. 4A and 4B may be iteratively performed, such as with a predetermined number (for example, one by one) of training images Xs and target images Xt iteratively input to the training apparatus or to a processor, of the training apparatus, performing the operations of FIGS. 4A and 4B.

Through the above-described feature training processes, the first duplicate layers F' 420 are adapted to be suitable for an extraction of a feature from the target image Xt based on a pre-trained characteristic to extract a feature from the training image Xs.

Figure 5:
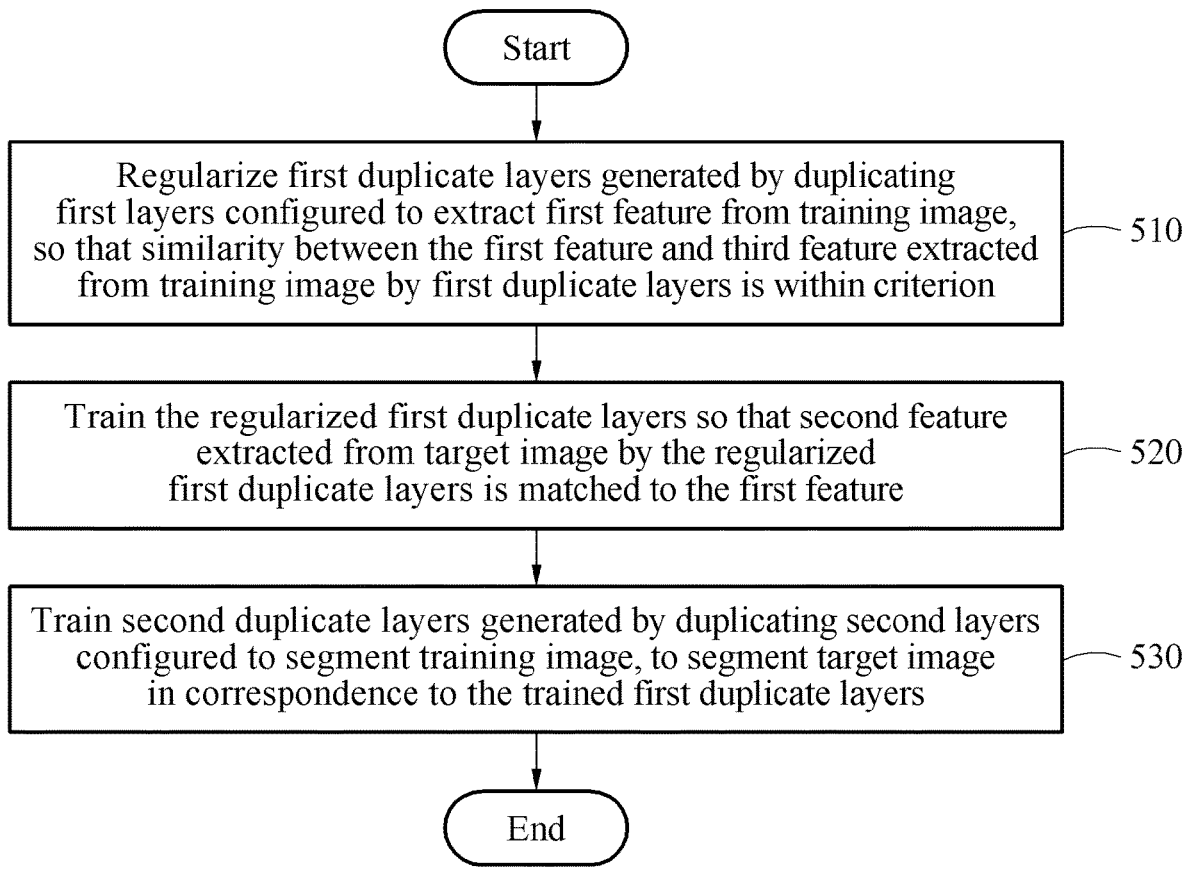
FIGS. 5, 6 and 7 are flowcharts illustrating examples of a learning method for an image segmentation.

FIG. 5 is a flowchart illustrating another example of a learning method for an image segmentation. Referring to FIG. 5, in operation 510, a training apparatus regularizes first duplicate layers generated by duplicating first layers configured to extract a first feature from a training image, so that a similarity between the first feature and a third feature extracted from the training image by the first duplicate layers is within a preset criterion.

In operation 520, the training apparatus trains the regularized first duplicate layers so that a second feature extracted from a target image by the regularized first duplicate layers is matched to the first feature.

In operation 530, the training apparatus trains second duplicate layers generated by duplicating second layers, to segment the target image in correspondence to the first duplicate layers trained in operation 520. The second layers are configured to segment the training image.

The training apparatus combines the first duplicate layers trained in operation 520 and the second duplicate layers trained in operation 530 to generate a new learning neural network.

Figure 6:
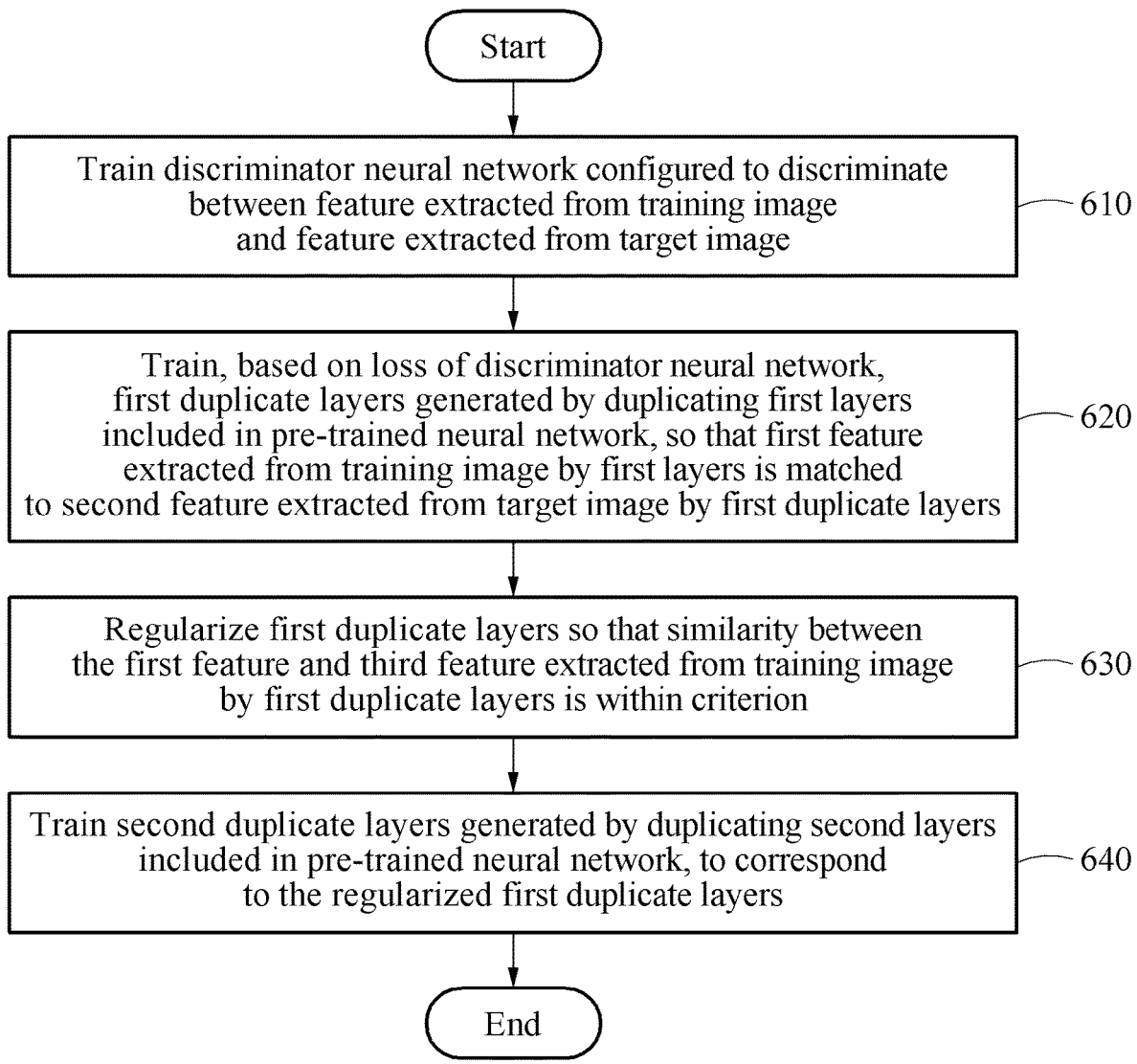

FIG. 6 is a flowchart illustrating another example of a learning method for an image segmentation. Referring to FIG. 6, in operation 610, a training apparatus trains a discriminator neural network configured to discriminate between a feature extracted from a training image and a feature extracted from a target image.

In operation 620, the training apparatus trains, based on a loss of the discriminator neural network, first duplicate layers generated by duplicating first layers included in a pre-trained neural network so that a first feature extracted from the training image by the first layers is matched to a second feature extracted from the target image by the first duplicate layers. For example, the training apparatus trains the first duplicate layers based on a loss of the discriminator neural network that discriminates between the first feature and the second feature, e.g., until the first feature is sufficiently matched to the second feature. The loss of the discriminator neural network corresponds to, for example, a loss corresponding to a difference between the first feature and the second feature.

In operation 630, the training apparatus regularizes the first duplicate layers so that a similarity between the first feature and a third feature that is extracted from the training image by the first duplicate layers is within a preset criterion.

In operation 640, the training apparatus trains second duplicate layers generated by duplicating second layers included in the pre-trained neural network, to correspond to the regularized first duplicate layers. The training apparatus trains the second duplicate layers so that a label of the training image segmented based on a feature extracted from the training image by the regularized first duplicate layers is matched to a predefined label corresponding to the training image.

Figure 7:
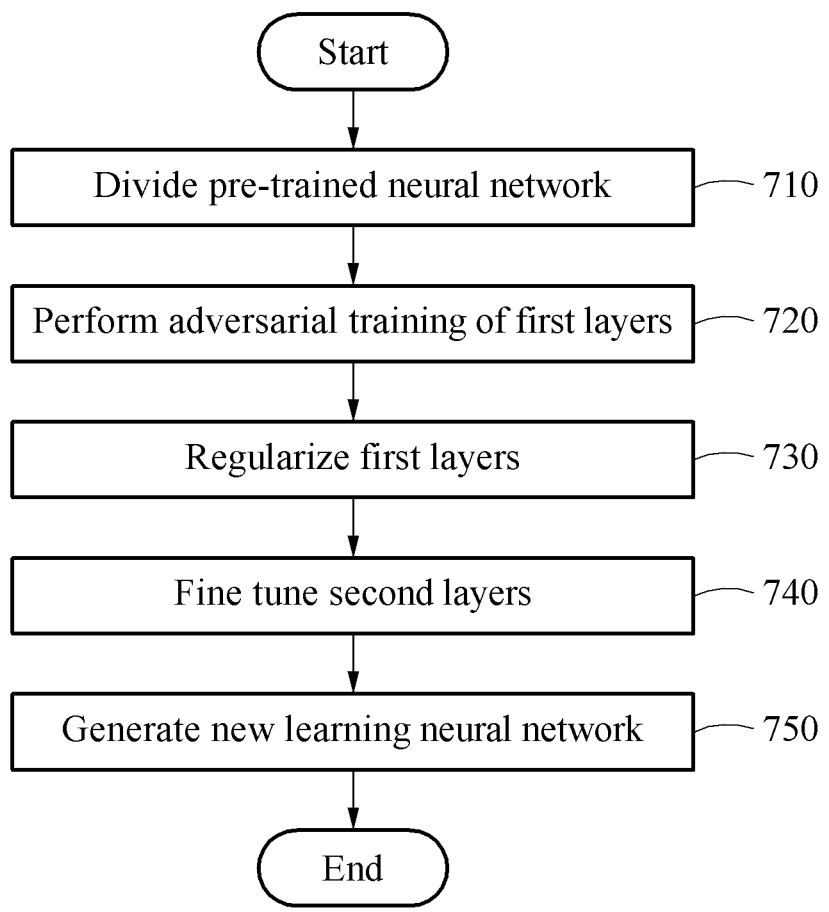

FIG. 7 is a flowchart illustrating another example of a learning method for an image segmentation. Referring to FIG. 7, in operation 710, a training apparatus identifying separate neural network layer portions of a pre-trained neural network into at least first layers and second layers. For example, the neural network may be trained based on one or more training images and predefined one or more labels corresponding to the one or more training images. The first layers may be configured to extract a first feature from a training image, and the second layers may be configured to segment the training image by semantics based on the first feature. The training apparatus separates the first layers from the second layers by identifying the different neural network portions of the neural network.

In operation 720, the training apparatus performs an adversarial training of the first layers. The adversarial training has been described above with reference to FIGS. 2, 4A and 4B, and accordingly description of the adversarial training is not repeated here.

In operation 730, the training apparatus regularizes the first layers trained by the adversarial training performed in operation 720. The trained first duplicate layers may be, for example, referred to as first duplicate layers.

In operation 740, the training apparatus fine tunes the separated second layers. For example, the training apparatus fine tunes second duplicate layers generated by duplicating the second layers in correspondence to the regularized first layers. The above description of FIG. 2 is also applicable to operation 740, and accordingly is not repeated here.

In operation 750, the training apparatus generates a new learning neural network. For example, the training apparatus combines the first layers regularized in operation 730 and the second layers fine-tuned in operation 740 to generate a new learning neural network.

Figure 8:
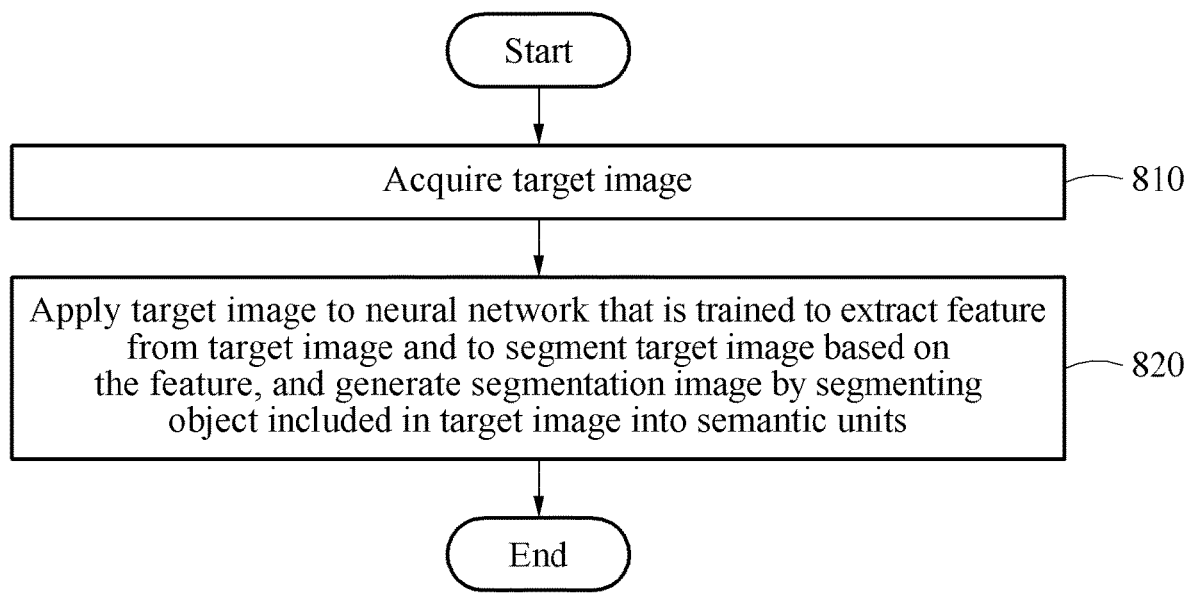
FIG. 8 is a flowchart illustrating an example of an image segmentation method.

FIG. 8 is a flowchart illustrating an example of an image segmentation method. Referring to FIG. 8, in operation 810, an image segmentation apparatus acquires a target image.

In operation 820, the image segmentation apparatus applies the target image to a trained neural network, and generates a segmentation image by segmenting an object included in the target image into semantic units. The neural network is trained to extract one or more features from the target image and to segment the target image based on the one or more features. For example, the trained neural network corresponds to a new neural network that is substituted for a neural network that has already been trained and that includes first layers configured to extract one or more first features from a training image and second layers configured to segment the training image based on the first feature. In this example, the new neural network includes first duplicate layers generated by duplicating the first layers, and second duplicate layers generated by duplicating the second layers.

For example, the first duplicate layers are trained so that the one or more first features extracted from the training image by corresponding first layers are matched to a second feature extracted from the target image by the first duplicate layers. In this example, the first duplicate layers are trained based on a loss corresponding to a difference between the first feature and the second feature so that the first feature is matched to the second feature. Also, the first duplicate layers are regularized so that a similarity between the first feature and a third feature extracted from the training image by the first duplicate layers is within a preset criterion.

The second duplicate layers are trained to segment the target image in correspondence to the regularized first duplicate layers. For example, the second duplicate layers are trained so that a label of the training image segmented based on a feature extracted from the training image by the regularized first duplicate layers is matched to a predefined label corresponding to the training image.

The image segmentation apparatus precisely analyzes where and how components in the segmentation image are present through a label corresponding to a region for each class (classes may include, for example, a road, a vehicle, a sidewalk, a person, an animal, a sky, or a building). The image segmentation apparatus segments an object in the target image into semantic units, analyzes semantics of a region obtained by segmenting the object in a pixel unit, and performs labeling for each class, to generate the segmentation image.

Figure 9:
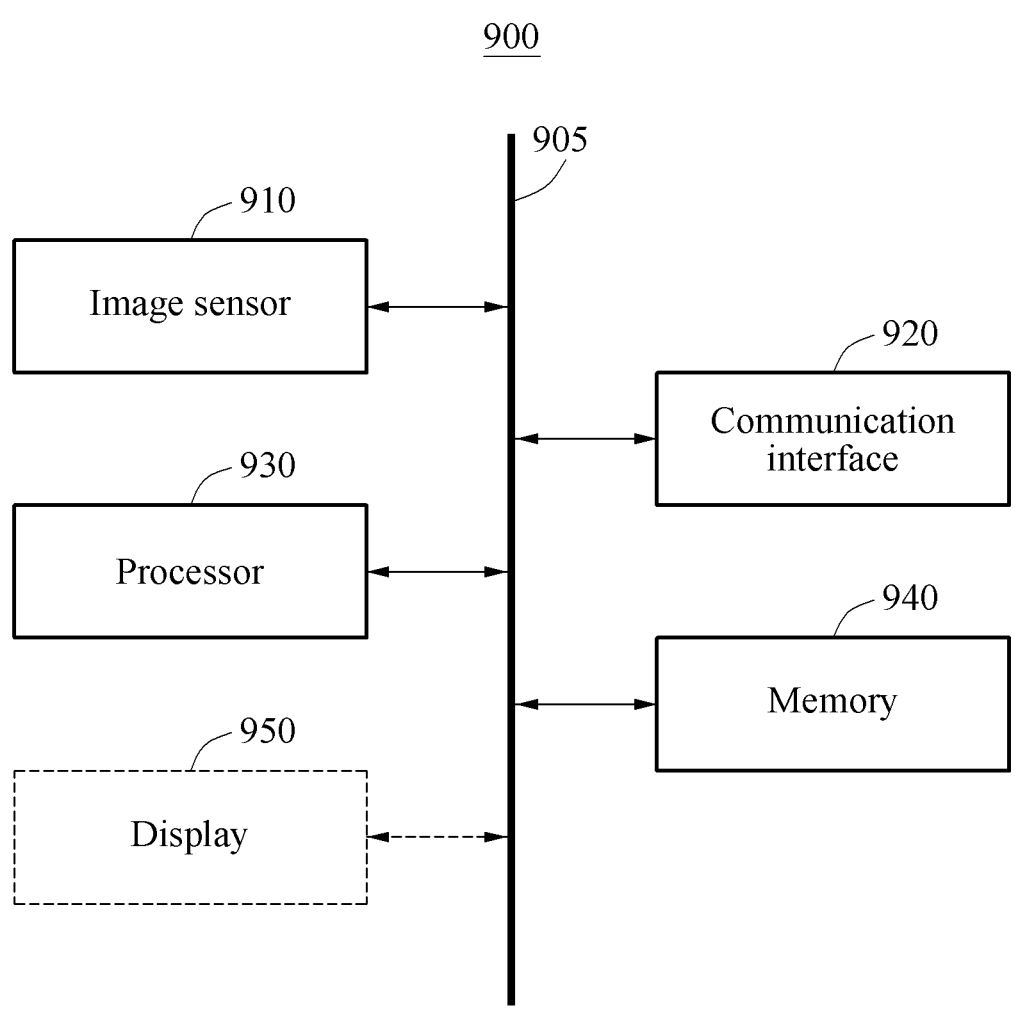
FIG. 9 is a block diagram illustrating an example of an image segmentation apparatus.

FIG. 9 illustrates an example of an image segmentation apparatus 900. Referring to FIG. 9, the image segmentation apparatus 900 includes an image sensor 910, a communication interface 920, a processor 930, and a memory 940. Depending on examples, the image segmentation apparatus 900 may further include a display 950. The image sensor 910, the communication interface 920, the processor 930, the memory 940, and the display 950 may communicate with each other via a bus 905.

The image sensor 910 acquires a target image. For example, the image sensor 910 detects or captures a target image captured outside the image segmentation apparatus 900.

A segmentation image generated by the image segmentation apparatus 900 is output to an external device. Depending on examples, the communication interface 920 receives the target image captured outside the image segmentation apparatus 900.

The processor 930 applies the target image to a neural network that is trained to extract a respective feature from each of the target image and the training image and to segment the target image based on the feature, and may generate a segmentation image by segmenting an object included in the target image into semantic units.

The processor 930 generates a segmentation image corresponding to the target image by implementing a neural network trained by the learning method described above with reference to FIGS. 1 through 8. Also, the processor 930 recognizes and/or identifies objects included in the target image based on the segmentation image.

The processor 930 also generates control information (for example, steering information, brake information or speed information) for driving of a vehicle based on information about the objects identified from the target image. Also, the processor 930 combines information about the recognized and/or identified object with map information and/or navigation information to generate an image for a vehicle driving assistance. The processor 930 may display the generated image on the display 950. The processor 930 transmits information about the identified object via the communication interface 920.

In addition, the processor 930 performs the methods described above with reference to FIGS. 1 through 8 or one or more algorithms corresponding to the methods. The processor 930 executes instructions and controls the image segmentation apparatus 900. The instructions executed by the processor 930 are stored in the memory 940.

The memory 940 stores the target image. Also, the memory 940 stores the segmentation image and/or the image for vehicle driving assistance generated by the processor 930.

The memory 940 also stores the parameters of the neural network that is trained to extract a feature from the target image and to segment the target image into semantic units based on the feature. The processor 930 generates a segmentation image from the target image using the neural network to which the parameters stored in the memory 940 are applied, and distinguishes and/or identifies objects included in the target image. The neural network is, for example, a CNN. The CNN may be trained to distinguish a bounding box of an object that is to be detected from the target image together with a type of the object.

Also, the memory 940 stores a variety of information generated in a processing operation of the processor 930. In addition, the memory 940 stores a variety of data and apparatuses. The memory 940 includes, for example, a volatile memory or a non-volatile memory. The memory 940 includes a large-capacity storage medium such as a hard disk to store a variety of data.

The training apparatus, image segmentation apparatus 900, the image sensor 910, the communication interface 920, the processor 930, the memory 940, the display 950, the bus 905, and other apparatuses, devices, and other components described herein with respect to FIGS. 1 through 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented learning method for an image segmentation, the learning method comprising:
    training first duplicate layers, as duplications of trained first layers of a pre-trained model, so that a second feature extracted from a target image by the trained first duplicate layers is matched to a first feature extracted from a training image by the trained first layers;
    regularizing the trained first duplicate layers so that a similarity between the first feature and a third feature extracted from the training image by the regularized first duplicate layers meets a threshold; and
    training second duplicate layers, as duplications of trained second layers of the pre-trained model, to be configured to segment the target image based on the regularized first duplicate layers, the trained second layer being configured to segment the training image.

2. The method of claim 1, further comprising:
    generating a new model by combining the regularized first duplicate layers and the trained second duplicate layers; and
    segmenting the target image by semantic segmentation using the generated new model.

3. The method of claim 1, wherein the training image is an image of a first domain environment different from a second domain environment of the target image.

4. The method of claim 1, wherein the training of the first duplicate layers comprises training the first duplicate layers based on a loss corresponding to a difference between the first feature and the second feature.

5. The method of claim 4, wherein the training of the first duplicate layers comprises training a discriminator neural network to discriminate between the first feature and the second feature.

6. The method of claim 1, wherein:
    the trained second duplicate layers are configured to segment the training image based on the third feature; and
    the training of the second duplicate layers comprises training the second duplicate layers so that a label of the segmented training image is matched to a predefined label corresponding to the training image.

7. The method of claim 1, wherein the training of the second duplicate layers comprises training the second duplicate layers to be configured to segment the target image based on another second feature extracted from the target image by the regularized first duplicate layers.

8. The method of claim 1, further comprising:
    identifying from a pre-trained neural network, as the pre-trained model, the trained first layers and the trained second layers based on the training image and predefined labels corresponding to the training image.

9. The method of claim 1, wherein the second duplicate layers are configured to segment the target image by semantic segmentation based on the second feature.

* * * * *